United States Patent [19]
Benedict et al.

[11] Patent Number: 5,136,209
[45] Date of Patent: Aug. 4, 1992

[54] VEHICLE LIGHT, WINDSHIELD WIPER CONTROL SYSTEM

[75] Inventors: Charles E. Benedict, Tallahassee; Donald M. Stumpf, Panama, both of Fla.

[73] Assignee: Benedict Engineering Company, Inc., Tallahassee, Fla.

[21] Appl. No.: 578,788

[22] Filed: Sep. 7, 1990

Related U.S. Application Data

[63] Continuation-in-part of Ser. No. 409,612, Sep. 15, 1989, Pat. No. 4,956,562.

[51] Int. Cl.[5] .......................... B60Q 1/02; H02G 3/00
[52] U.S. Cl. .......................................... 315/80; 315/82; 307/10.1; 307/10.8
[58] Field of Search ............... 307/10.8, 10.1; 315/80, 315/82, 83, 77, 155, 159; 340/641

[56] References Cited

U.S. PATENT DOCUMENTS

| | | | |
|---|---|---|---|
| 3,500,119 | 3/1970 | Price | 315/82 |
| 3,500,120 | 3/1970 | Schultz | 315/82 |
| 3,519,837 | 7/1970 | Nolin et al. | 315/82 |
| 3,591,845 | 7/1971 | Vanderpoel, Jr. | 315/82 |
| 3,600,596 | 8/1971 | Aloisantoni | 315/82 |
| 3,769,519 | 10/1973 | Adamian | 315/83 X |
| 3,824,405 | 7/1974 | Glaze | 315/82 |
| 3,909,619 | 9/1975 | Kniesly et al. | 315/82 |
| 4,057,742 | 11/1977 | Binegar | 315/82 |
| 4,097,839 | 6/1978 | Lesiak | 315/82 |
| 4,139,801 | 2/1979 | Linares | 315/83 |
| 4,236,099 | 11/1980 | Rosenblum | 315/83 |
| 4,281,365 | 7/1981 | Elving et al. | 362/20 |
| 4,301,390 | 11/1981 | Earle | 315/82 |
| 4,337,400 | 6/1982 | Hahn | 307/10 |
| 4,355,271 | 10/1982 | Noack | 315/77 X |
| 4,656,363 | 4/1987 | Carter et al. | 307/10.1 |
| 4,667,129 | 5/1987 | Papillon | 315/82 |
| 4,859,867 | 8/1989 | Larson et al. | 307/10.1 |
| 4,956,562 | 9/1990 | Benedict et al. | 307/10.8 |
| 4,985,660 | 1/1991 | Cronk | 315/82 |

Primary Examiner—Eugene R. LaRoche
Assistant Examiner—Son Dinh
Attorney, Agent, or Firm—Dowell & Dowell

[57] ABSTRACT

A control system for automatically turning on the headlights (and parking lights) of a vehicle has an input section that includes the ignition switch, the manually operated windshield wiper switch, and condition responsive light sensor and moisture sensor switches. These switches operate through a logic circuitry through an output section to turn on and to keep turned on the lights when any of certain switch combinations are turned on:

a) ignition, windshield wiper, light sensor and moisture sensor;
b) ignition, windshield wiper and light sensor;
c) ignition, windshield wiper and moisture sensor;
d) ignition and windshield wiper;
e) ignition, light sensor and moisture sensor;
f) ignition and light sensor; or
g) ignition and moisture sensor.

In the event that the windshield wiper is turned off the light level sensor causes the lights to be turned off.

The windshield wipers are turned on with the following switch combinations even though the manual windshield wiper switch is turned off:

a) ignition, light sensor and moisture sensor; or
b) ignition and moisture sensor.

52 Claims, 8 Drawing Sheets

VEHICLE LIGHT, WINDSHIELD WIPER CONTROL SYSTEM

CROSS-REFERENCE TO RELATED APPLICATION

This application is a continuation-in-part of U.S. patent application Ser. No. 07/409,612 filed Sep. 15, 1989, entitled HEADLIGHT, WINDSHIELD WIPER CONTROL SYSTEM now U.S. Pat. No. 4,956,562.

BACKGROUND OF THE INVENTION

1. Field of the Invention

This invention relates to an electronic system for controlling the turning on and off of the headlights and parking lights in conjunction with the operation of the ignition switch, windshield wipers, and light sensor and moisture sensor switches.

2. History of the Related Art

The turning on of the headlights of a vehicle during poor visibility conditions is a safety measure. In some states the law requires that when the windshield wipers are turned on such as during rain conditions, the headlights must also be turned on.

Systems for automatically turning on the headlights when the windshield wipers are turned on have been known in the prior art. For example in the U.S. Pat. No. 4,656,363 to Carter et al., a transistor circuit is employed to turn the vehicle headlights on and off when the windshield wipers are turned on and off. Similarly, the U.S. Pat. No. 4,236,099 to Rosenblum discloses a transistor circuit for the same purpose. In each case the operation is dependent upon the proper operation of a power transistor. Other United States patents which disclose similar or related systems are Price U.S. Pat. No. 3,500,119, Schultz U.S. Pat. No. 3,500,120, Nolin et al. U.S. Pat. No. 3,519,837, Vanderpoel U.S. Pat. No. 3,591,845, Aloisantoni U.S. Pat. No. 3,600,596, Glaze U.S. Pat. No. 3,824,405, Binegar U.S. Pat. No. 4,057,742, and Lesiac U.S. Pat. No. 4,097,839.

Other United States patents disclosing wiper control headlights devices are Earle U.S. Pat. No. 4,301,390, Hahn U.S. Pat. No. 4,337,400, Kniesly et al. U.S. Pat. No. 3,909,619, and Papillion U.S. Pat. No. 4,667,129.

SUMMARY OF THE INVENTION

The present invention involves a digital logic gating circuit whose inputs are low voltage leads associated with the vehicle's ignition switch, windshield wiper switch, and condition responsive light sensor and moisture sensor switches. The inputs feed to logic circuitry which in turn controls output circuitry to the headlights and parking lights and windshield wipers. The output circuitry may work through various components. These include a pulse actuated mechanically latching relay; a continuous, mechanical relay; or solid state switches. The headlights and parking lights are turned on and kept on if any of the following combinations of inputs are present:

a) ignition, windshield wiper, light sensor and moisture sensor;
b) ignition, windshield wiper and light sensor;
c) ignition, windshield wiper and moisture sensor;
d) ignition, windshield wiper;
e) ignition, light sensor and moisture sensor;
f) ignition and light sensor; or
g) ignition and moisture sensor.

The light level sensor, acting through the logic circuitry deactivates the circuit to turn off the headlights in the event that the light level sensor indicates a sufficiently high level of ambient light.

An RC or time constant circuit is employed to prevent the lights from cycling on and off during the daylight when the windshield wipers are on intermittent operation.

In order to reduce the possibility of failure of operation the logic circuit preferably has a plurality of parallel identical circuits which activate the relay circuit that operates the headlights. Due to the redundancy of the circuits and the arrangement of the components, the possibility of a system failure is significantly less than otherwise would be expected.

An added safety feature is that within each parallel logic circuit there is a complementary logic circuit so that if a component failure occurs in one portion of the circuit the headlights will not inadvertently be turned off.

A safety feature in the latching relay circuit is that there are two parallel identical circuits wired in series both of which must be turned on to latch a relay in the correct position With the continuous relay there are two parallel identical circuits that are wired in parallel. Thus if one circuits incorrectly turns off the other circuit will stay turned on, keeping the relay energized.

With the solid state circuit where the headlights and parking lights are combined there are two parallel identical circuits each controlling two separate solid state transistors. If one circuit fails and turns off its transistor the other will stay on keeping the headlights on. However this is not the case for the separate headlight and parking light configuration in which if one of the circuits fails then neither the parking lights nor the headlights will turn off.

The windshield wipers are turned on in the output section eve though the manual windshield wiper switch is turned off, with either of the following input combinations:

a) ignition, light sensor and moisture sensor; or
b) ignition and moisture sensor.

On the other hand, when the manual windshield wiper switch is on, the control of the wipers is with the windshield wiper switch, not with the relay in the output section.

DESCRIPTION OF A PREFERRED EMBODIMENT

General Overview

Figure 1A:
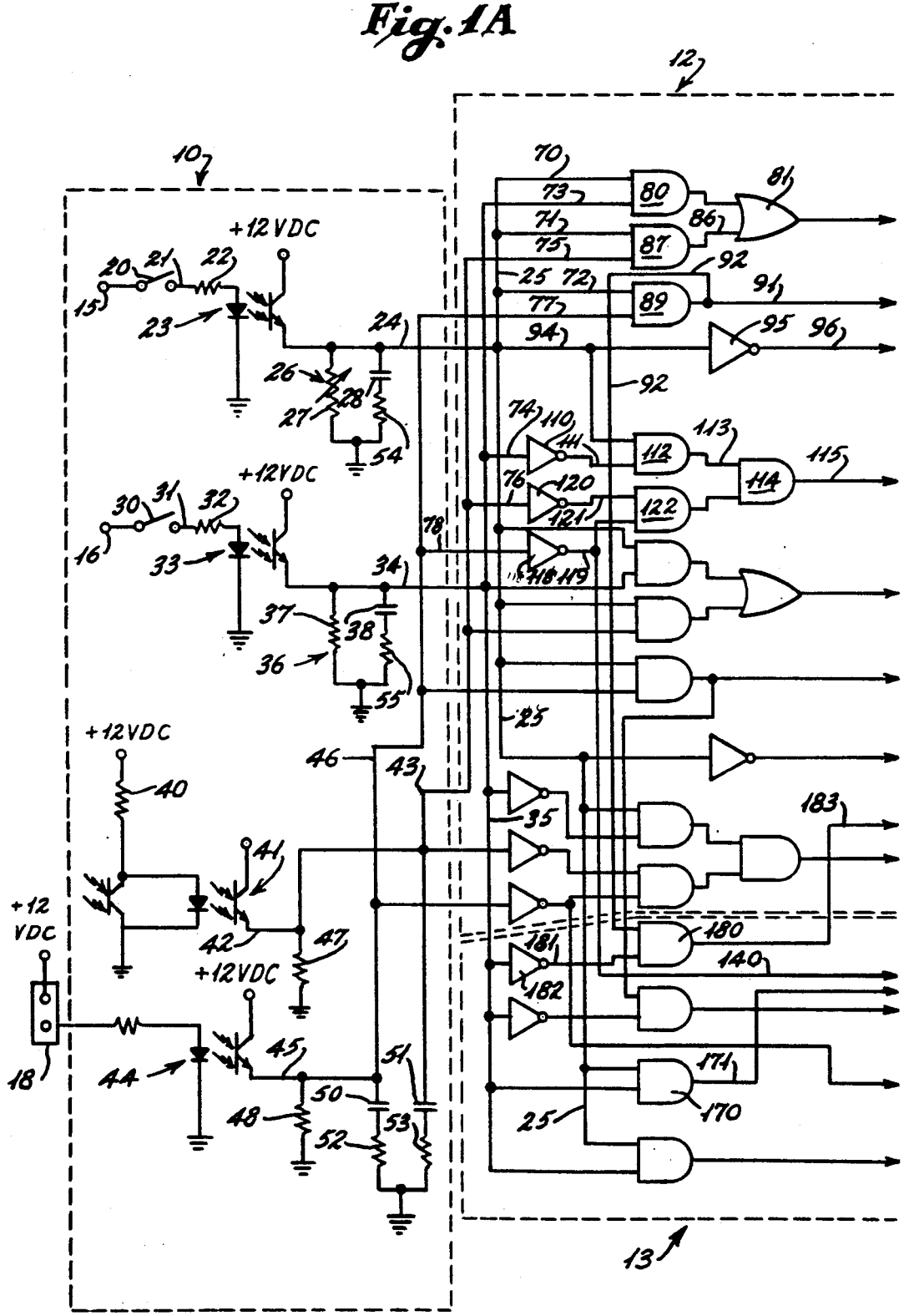
FIG. 1(A and B) is a schematic of a preferred embodiment in which the output includes a mechanical latching relay.
FIG. 1C is a schematic of an embodiment similar to FIG. 1 but illustrating a modified output section.

Each of the described embodiments may be summarized in four sections. First there is a manual and condition responsive input. Secondly, a regulated voltage supply. Next is the logic circuitry that receives the inputs. And last, there is an output circuit.

The logic circuitry may be viewed as divided into two segments, one for the headlight and parking lights, the other for the windshield wipers. The output circuit has separate segments for (a) the headlight and parking light relays and (b) for the windshield wipers relay.

The inputs and the regulated voltage supply are the same in each case. The logic circuitry is the same for FIGS. 1, 3 and 4 but is simplified in FIG. 2. The outputs differ in the means by which the vehicle's lights and windshield wipers are turned off and on.

Manual and Condition Responsive Inputs

The input section 10 includes an ignition switch post 15, windshield wiper switch post 16, light sensor 17 and moisture sensor 18. Beginning at the top there is ignition switch 20, line 21, protective resistor 22, opto-isolator 23, and line 24 which leads to the ignition switch trunk line 25. Line 24 has a time delay circuit 26 including adjustable resistor 27 and capacitor 28 in order to provide an adjustable time delay circuit to maintain a high voltage on the following ignition logic circuit after the ignition is turned on. The capacitor also serves as a transient suppressor.

Moving down to the next line the windshield wiper switch 30 is connected by line 31 to protective resistor 32 and then to opto-isolator 33 to output line 34 which i connected to the windshield wiper trunk line 35. The line 34 is provided with a time delay circuit 36 having resistor 37 and capacitor 38 in order to keep the voltage high on the windshield wiper logic circuit line when the windshield wiper switch is in the intermittent position. The capacitor also serves as a transient suppressor. Intermittent position refers to the time when the wiper is temporarily not moving, an optional characteristic in most modern vehicles. The value of the capacitor 38 may be selected to accommodate the longest intermittent time delay. The capacitor also serves as a transient suppressor.

The sensitivity of the light sensor 17 may be adjusted by the resistor 40. The light sensor switch feeds through opto-isolator 41 to line 42 to the light sensor trunk line 43. Resistor 47 connected to line 42 protects the logic gates against surges and thus suppresses turnoff of the lights in case the vehicle passes in and out of light-dark zones.

The moisture sensor 18 similarly feeds through opto-isolator 44 to line 45 to the moisture sensor trunk line 46. Resistor 48 suppresses turn off in case the vehicle passes through zones of moisture, e.g. fog.

Connected to the lines 43 and 46 are capacitors 50 and 51 which serve as transient suppressant devices for the logic gates. Resistors 54 and 55 beneath capacitors 28 and 38, respectively, and resistors 52 and 53 beneath capacitors 50 and 51, respectively, provide a safety feature in the event that the capacitors short out. If a capacitor shorts out and there were no resistor the high voltage would short to ground causing the headlights to turn off if in the on position. However, with these resistors in place, if the capacitor shorts, the high voltage would remain high.

Regulated Voltage Supply

A regulated voltage supply, indicated by the box 11, is provided to protect the solid state components in the output section, indicated by the box 13, from transient voltage and high or low voltage.

The protection of the solid state components and the input section by the opto-isolators 23, 33, 41 and 44 has already been described. These isolate the input voltages from the transistor outputs to the circuits. The previously described RC circuits 26 and 36 on the input lines 24 and 34 absorb any voltage spikes which are coming in on the 12 VDC supply line to the light actuated transistors.

In the regulated voltage supply section 11, the resistor 60, zener diode 61, capacitors 62 and 63, and diode 64 filter transients and large voltage surges from the 12 VDC supply and thus protect the power transistors in the output section 13.

Logic Circuitry

Reference is now made to the logic circuitry indicated within the boxes 12 and 13. The ignition input trunk line 25 has branches 70, 71 and 72, and another, to be described later. The windshield wiper trunk line 35 has branches 73 and 74. The light sensor trunk line 43 has branches 75 and 76; and the moisture sensor trunk line 46 has branches 77 and 78.

When there is a high on the ignition branch line 70 and the windshield washer branch line 73, this results in a high on the output of the AND gate 80 to the OR gate 81, resulting in a high on its output to OR gate 82 to line 83 thus turning on transistor S1, through the resistor 84.

When there is a high on the ignition branch 71 and a high on the light sensor branch 75 this results in a high to the AND gate 87 thus putting a high on its output 86 to the OR gate 81 and, in turn, a high on the output of the OR gate 82 thus turning on the transistor S1.

When there is a high on the ignition branch 72 and on the moisture sensor branch 77 this puts a high on the AND gate 89, which through lead 91 produces a high on the output of the OR gate 82 thus turning on S1.

From lead 91, a branch 92 connects to the input of AND gate 180. The other input line 181 is connected to the output of invertor 182 whose input line 35 is the trunk line of the windshield wiper switch. Thus, if the windshield wiper switch is off, the AND gate 180 has a positive output through line 183 and resistor R14 to transistor S3, turning it on. Thus, a high on the ignition branch 72 and the moisture sensor branch 77 puts a high on the AND gate 89 and its output 91 and 92 thereby turning on S3. This condition continues whether the light sensor 17 is turned on or not.

In addition to the branches from the ignition switch mentioned above there is an additional branch 94 which is connected to an invertor 95 having an output 96. Thus, a low on the branch line 94 from the ignition causes a high on the output 96 from the invertor 95 leading to the OR gate 98 having an output 99 which is therefore made positive leading to the AND gate 100 having an output 101 to the transistor S2. When the input line 83 to S1 is low this puts a high on the output of the invertor 102 thus putting a high on the input 103 to the AND gate 100 resulting in a high on the output of the AND gate 100 and thus turning on S2.

S2 may also be turned on as follows. A low on the windshield wiper branch line 74 to the invertor 110 results in a high on its output 111 which is connected as an input to the AND gate 112 having output 113 which is connected to the AND gate 114 having an output 115 leading to the OR gate 98. If at the same time there is a low on the moisture sensor branch line 78 to the invertor 118 this produces a high on its output 119 leading to the AND gate 100. If at the same time there is a low on the light sensor branch 76 to the invertor 120 this puts a high on its output 121 leading to the AND gate 122. With both inputs high this puts a high on the output of the AND gate 114 and a high on the output of the OR gate 98. With both inputs high this puts a high on the output of the AND gate 100 thereby turning on S2.

S4 may be turned on as follows. A low on ignition branch 94 puts a high on the output 96 of the invertor 95. This in turn puts a high on the output 135 from the OR gate 131. When the input line 183 to S3 is low this puts a high on the invertor 133 through its input 132 and to its output 134. With both inputs 134 and 135 high to the AND gate 136 the output 137 is high to the element S4.

Another way to turn on S4 is as follows. When moisture sensor branch line 78 is low this puts a high on line 119 from the invertor 118 to the line 140 leading to the OR gate 131. When S3 is low, this puts a high on the output of invertor 133. With both inputs high this puts a high on the output of the AND gate 136 turning on S4.

The inputs to S3 and S4 which control the operation through the logic system of the windshield wipers is described above.

It will be apparent that the wiper portion of the circuit includes the transistors S3 And S4 and the preceding portions of the circuit. Thus, the overall circuit may be used merely to turn on the lights, the wipers, or the lights and the wipers.

The logic circuitry is divided into two identical parts thus providing for duplicate functioning in the event that one section fails to function properly.

In addition, there is a safety feature that is built into each of the two parts. Thus, one logic circuit includes the gates 80, 87, 89, 81 and 82. It will be observed that the next adjacent circuit which includes the gates 110, 120, 118, 112, 122, 114 and 98 is the complement of the foregoing circuit. The logic states which come out of the logic gate 102 are the same as the logic states which come out of the gate 98. The circuit could be designed using only the logic gate 102 as the input to switch S2 but if a component failure occurred S2 could be triggered which would turn the headlights off. By providing the complementary circuit and comparing it to the output of the logic gate 102 there is assurance that both signals are the same before turning on S2.

Figure 1B:
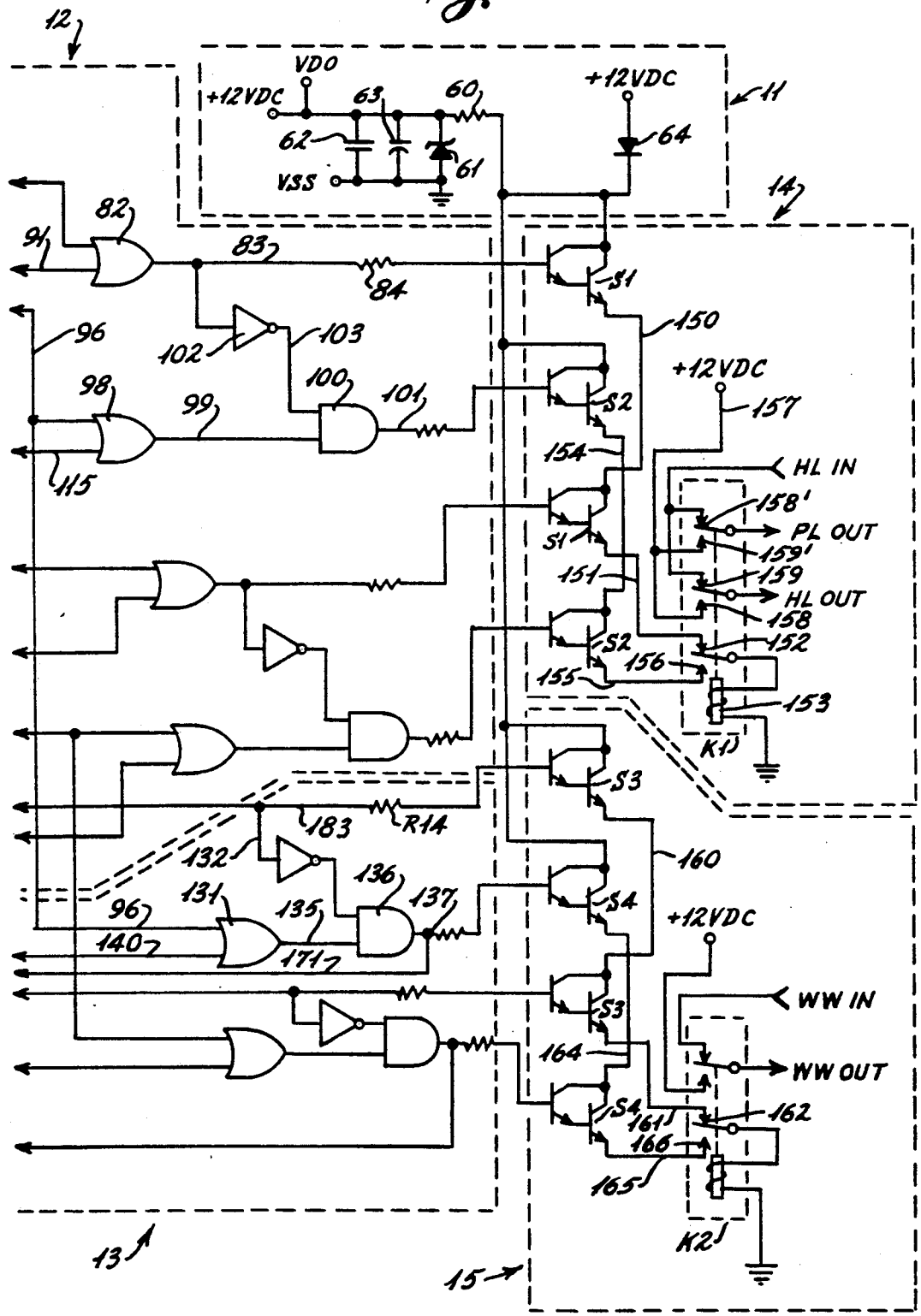
Figure 1C:
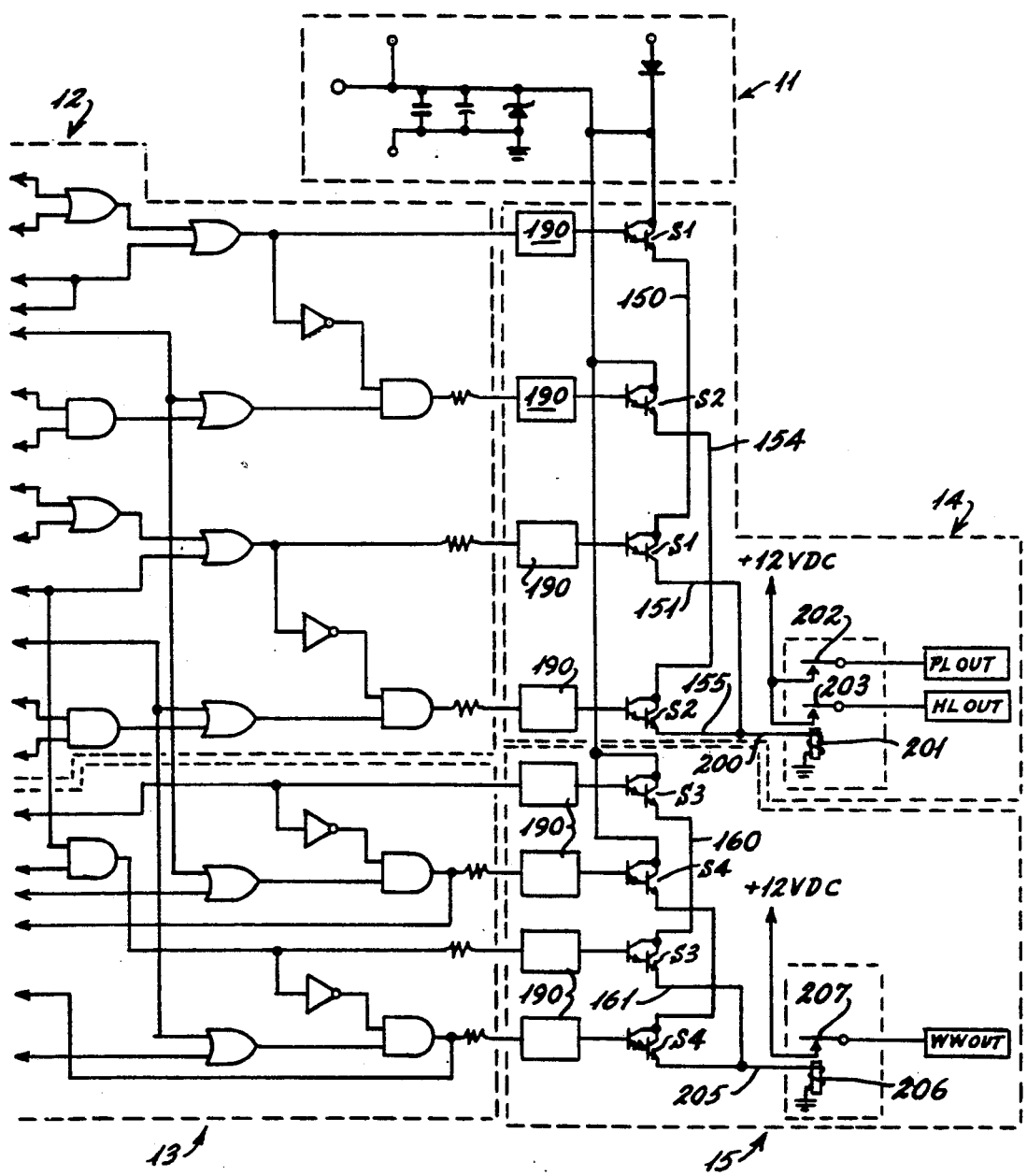
Figure 2:
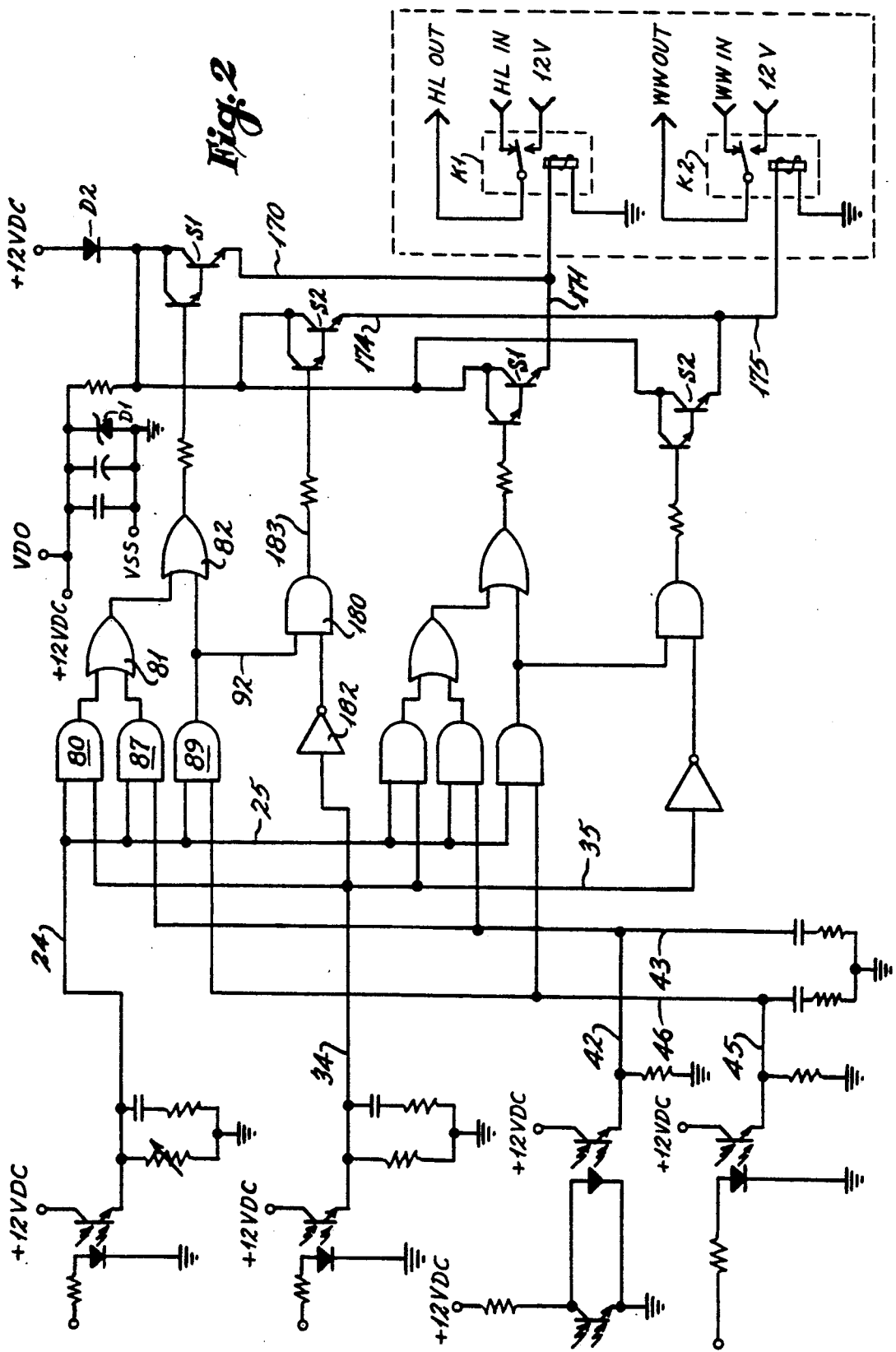
FIG. 2 is a schematic of a modification in which the output includes a continuous relay.

With reference to FIG. 2 the logic circuitry includes the same logic gates 80, 87, 89, 81, 82, 180 and 182 as previously described, preceded by the same inputs, but does not include the complementary circuit with the invertors as disclosed in connection with the logic circuit of FIG. 1. However, a safety feature of FIG. 2 is that the two identical circuits are wired in parallel. If one circuit incorrectly turns off the other circuit will stay turned on keeping the relay energized.

Windshield Wiper Switch Override

If the windshield wiper switch is turned on, this overrides any control of the windshield wiper motor which could otherwise result from actuation of the moisture switch.

Thus, when the windshield wiper switch is on, in addition to the ignition switch, windshield wiper switch line 34 and trunk line 35 are connected to AND gate 170 (near the bottom of FIG. 1A). If ignition is on, the ignition trunk line 25 is also connected to gate 170. The positive output from the gate 170 through line 171 bypasses the AND gate 136 and turns on S4, thus placing the control of the windshield wiper entirely under the manual switch.

Output Circuits

The boxes 14 and 15 in FIG. 1B illustrate the output circuit for the latching relay. This includes the transistor switches S1, S2, S3 and S4, and the mechanical relays K1 and K2. K1 and K2 may be stepping switches as described in U.S. patent application Ser. No. 07/409,612.

Thus, from the switches S1 the lines 150 and 151 are connected to switch contact 152, controlled by relay coil 153, the completion of the circuit latching the stepping switch in the on position and thus putting +12 VDC from the battery through line 157, switch contacts 158, 159, 158' and 159' to the headlights and the parking lights.

When switch S2 is turned on this feeds through the lines 154 and 155 to the other relay contact 156 which latches the relay in the off position. This position permits the switches on the dashboard to control the headlights and parking lights.

When S3 is turned on this feeds through the lines 160 and 161 to the contact 162 in the relay K2 which latches the relay in the on position thereby putting 12 VDC from the battery to the windshield wiper motor.

When S4 is turned on this feeds through the lines 164 and 165 to the contact 166 in the relay which latches the relay in the off position thereby permitting the windshield wiper switch on the dashboard to control the windshield wiper motor.

FIGS. 1C and 1D illustrate the use of pulse generators 190 in the lines to the transistor switches and the use of simplified outputs for the lights and windshield wipers. Such pulse generators are well-known in the art. Their outputs trigger the power transistors, which drive the relay coils.

Thus, from the switches S1, the lines 150 and 151 are connected to line 200 to relay coil 201 which operates the relay switches 202 and 203 for the parking and headlights. Lines 154 and 155 from the switches S2 are connected to the relay coil input line 200. Since the coil 201 is a stepping coil, of the type previously described, a pulse from S1 operates to move the relay to an on position where it remains until a pulse from S2 moves it to an off position.

Switches S3 and S4 operate their relay in a similar manner. Thus, from the switches S3 the lines 160 and 161 are connected to line 205 to relay coil 206 which operates the relay switch 207 for the windshield wiper.

Figure 3A:
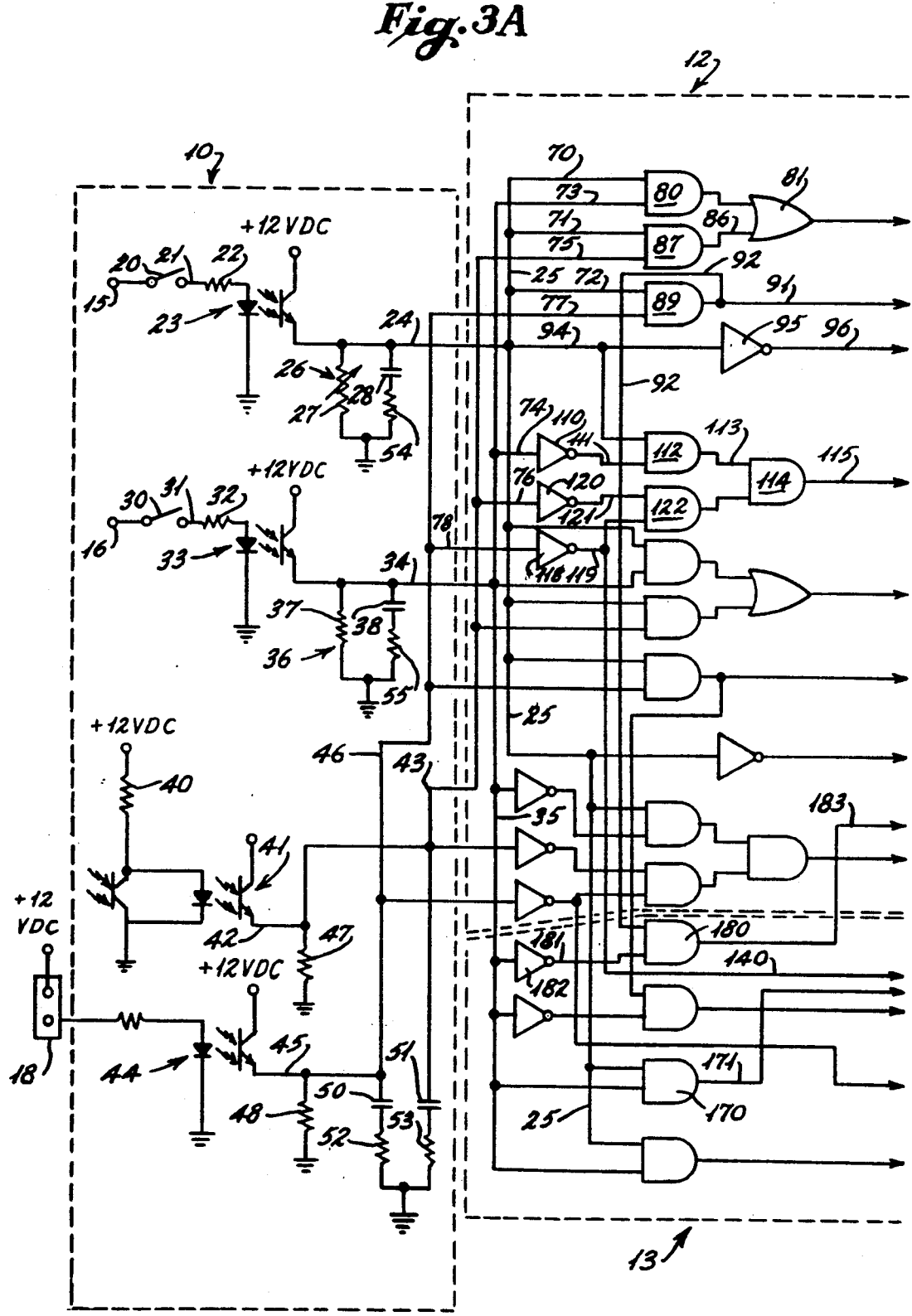
FIG. 3(A and B) is a schematic of an embodiment similar to FIG. 1 but illustrating another modified output section.
Figure 3B:
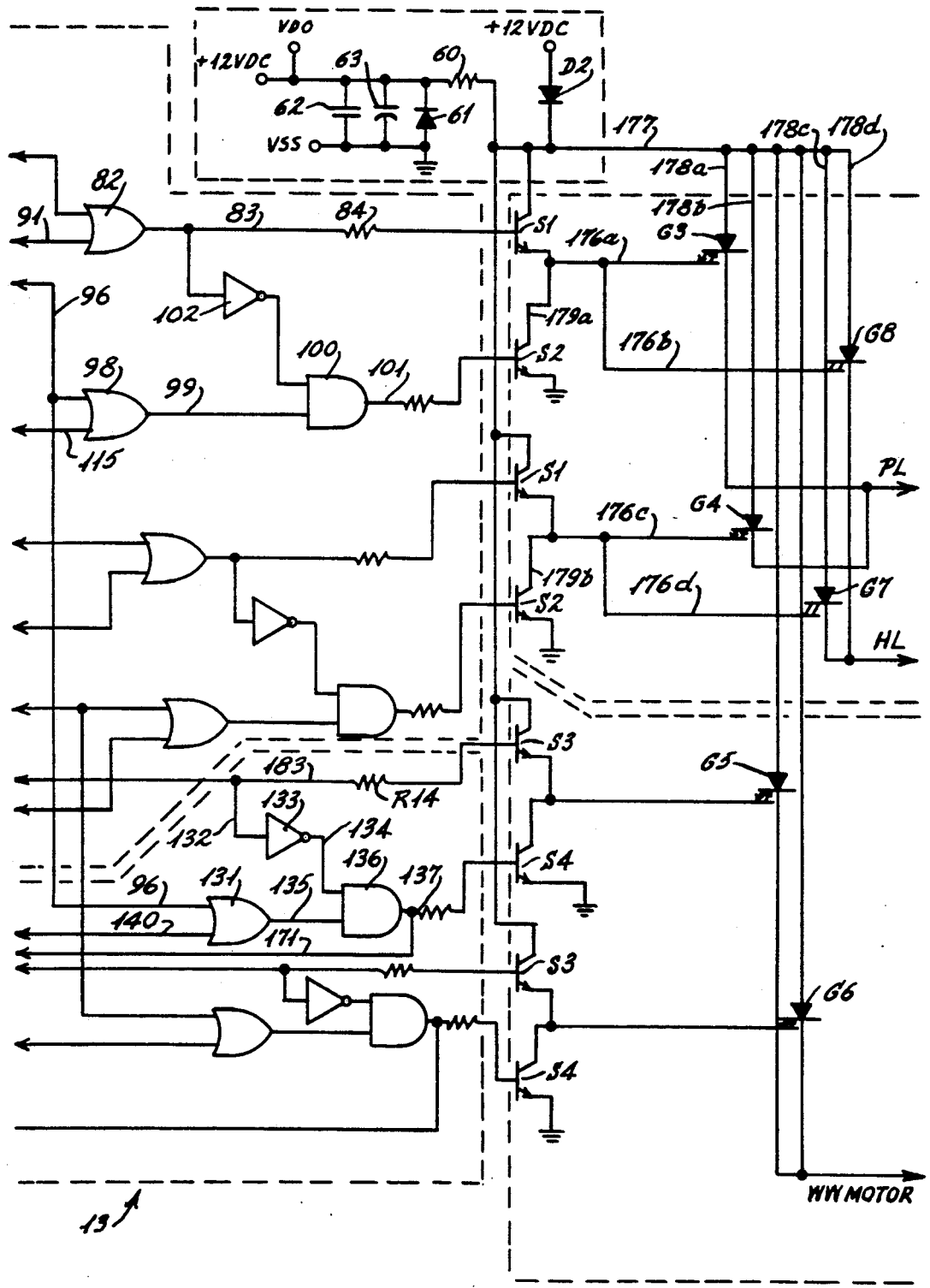
Figure 4A:
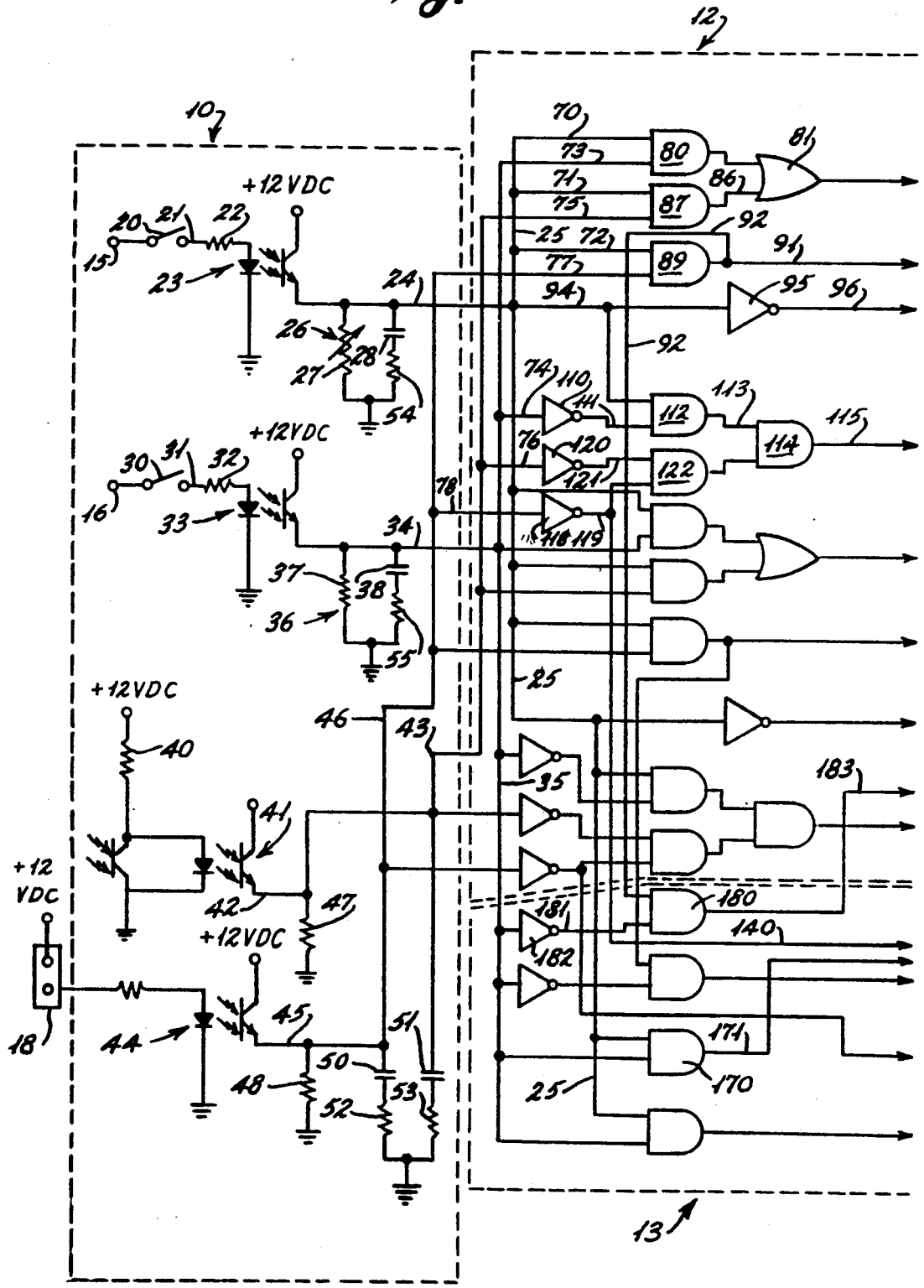
FIG. 4(A and B) is a schematic of an embodiment similar to FIG. 1 but illustrating still another modified output section.

Pulse generation may also be used, if desired, to operate the output switches in FIGS. 3 and 4.

With reference to FIG. 2, the continuous relay output illustrated therein has a relay circuit consisting of the transistor switches S1 and S2 and the relays K1 and K2. Thus, when S1 is turned on, the lines 170 and 171 are connected to the relay K1 which cause it to be energized to the on position thereby putting 12 VDC from the battery to the headlights and parking lights. When S1 is turned off this deenergizes the relay K1 to the off position thereby putting control in the switches from the dashboard to the headlights and the parking lights.

When S2 is turned on, acting through lines 174 and 175 this energizes the relay K2 to the on position which puts 12 VDC from the battery to the windshield wiper motor. When S2 is turned off this deenergizes the relay K2 to the off position which puts control of the windshield wiper switch from the dashboard to the windshield wiper motor With reference to FIG. 3B a GTO or TMOS output circuit is illustrated which consists of the transistor switches S1, S2, S3 and S4, and the solid state switches such as a gate turnoff (GTO), or triac metal oxide semiconductor (TMOS), G3, G4, G5, G6, G7, and G8. The switches G3 to G8 are well-known in the art. Thus, in the illustrated circuit, a 12 VDC impulse from S1 is fed to the inputs of G3, G8, G4 and G7 by lines 176a–d. This permits 12 VDC from D2 to pass through line 177 through branch lines 178a–d to the parking and headlights. This continues even if the input of 176a–d ceases unless the bias to the switches is drawn off when S1 is off and S2 is on.

Thus, in the illustrated combined headlight and parking light configuration, when S1 is turned on, it turns on G3, G4, G7 and G8 which puts 12 VDC from the battery to the headlights and parking lights.

When S1 is off, and S2 is on, this removes the bias from the switches through lines 179a and b, thus removing 12 VDC from the parking and headlights.

When S3 is turned on, G5 and G6 are turned on which puts 12 volts from the battery to the windshield wiper motor.

When S4 is turned on D5 and D6 are turned off, which removes 12 VDC from the windshield wiper motor.

Furthermore, the functions of G3 and G4 are duplicated by G8 and G7. Thus, failure of either will not turn off the lights.

Figure 4B:
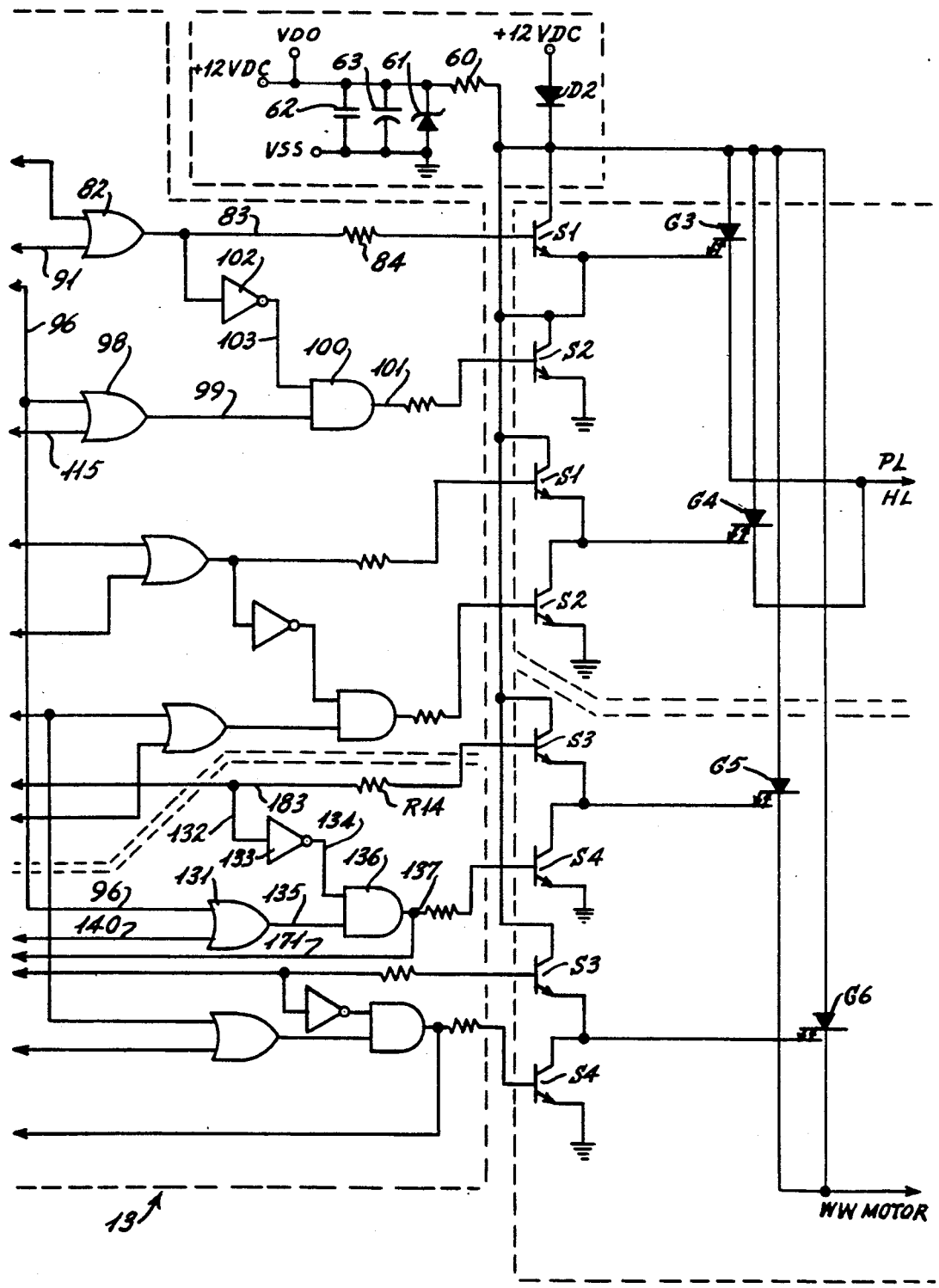

The output configuration of FIG. 4B is similar to that of FIG. 3B except that the duplication of G8 and G7 is omitted. Even here, however, there are two parallel identical circuits controlling the separate outputs. Thus, if one logic path fails, the lights are not turned off.

In a vehicle equipped with the system described, it is contemplated that there will also be a manual switch for the headlights and parking lights by which these may be turned on, but which will not turn these off if the relay system is conditioned to turn them on.

In order to facilitate understanding the logic circuitry a truth table is reproduced on the following page.

| TRUTH TABLE | | | | | | | |
|---|---|---|---|---|---|---|---|
| IG | WW | LS | MS | S1 | S2 | S3 | S4 |
| 1 | 1 | 1 | 1 | 1 | 0 | 0 | 1 |
| 1 | 1 | 1 | 0 | 1 | 0 | 0 | 1 |
| 1 | 1 | 0 | 1 | 1 | 0 | 0 | 1 |
| 1 | 1 | 0 | 0 | 1 | 0 | 0 | 1 |
| 1 | 0 | 1 | 1 | 1 | 0 | 1 | 0 |
| 1 | 0 | 1 | 0 | 1 | 0 | 0 | 1 |
| 1 | 0 | 0 | 0 | 0 | 1 | 0 | 1 |
| 1 | 0 | 0 | 1 | 1 | 0 | 1 | 0 |
| 0 | 0 | 0 | 0 | 0 | 1 | 0 | 1 |
| 0 | 0 | 0 | 1 | 0 | 1 | 0 | 1 |
| 0 | 0 | 1 | 0 | 0 | 1 | 0 | 1 |
| 0 | 0 | 1 | 1 | 0 | 1 | 0 | 1 |
| 0 | 1 | 0 | 0 | 0 | 1 | 0 | 1 |
| 0 | 1 | 0 | 1 | 0 | 1 | 0 | 1 |
| 0 | 1 | 1 | 0 | 0 | 1 | 0 | 1 |
| 0 | 1 | 1 | 1 | 0 | 1 | 0 | 1 |

1 = +12 VDC
0 = 0 VDC
S1 = HL ON
S2 = HL OFF
S3 = WW ON
S4 = WW OFF

I claim:

1. An automatic system for controlling the turning on of vehicle headlights when any of the following switch combinations are turned on:
   a) ignition, windshield wiper, light sensor;
   b) ignition, and windshield wiper;
   c) ignition and light sensor;
   and keeping them on as long as any of such switch combinations are on, comprising manual on-off switches for the ignition and windshield wiper and a condition responsive switch for the light sensor, a multistage digital logic circuit having a first stage which comprises a plurality of gates coupled to the outputs of said switches, at least one additional stage of gates connected to the outputs of said first stage of gates, a first relay circuit, an electronic relay switch, said relay switch having means for connecting said headlights to power supply means, said first relay circuit being alternately connectable to actuating means for said relay switch which governs the connection of said headlights to said power supply means, said power supply means connected to said first relay circuit, and control means for said first relay circuit, said multistage digital logic circuit connecting the outputs of said ignition, windshield wiper and light sensor switches to the control means for said first relay circuit.

2. The invention of claim 1, and opto-isolator semiconductor means between the ignition, windshield wiper and light sensor switches and the relay circuit which isolates the input voltages from the outputs of the semi-conductor means.

3. The invention of claim 1, in which time delay means it interposed between the ignition switch and the logic circuitry to protect the logic means from transient voltages and to maintain a high level of voltage for a limited time after the logic circuitry of the ignition switch is turned off.

4. The invention of claim 1, in which time delay means is interposed between the windshield wiper switch and the logic means so that the windshield wipers will appear to be continuously on during intermittent operation.

5. The invention of claim 1, and a moisture sensor switch, said system controlling the turning on of the vehicle headlights when any of the following additional switch combinations are turned on:
   a) ignition, windshield wiper, light sensor and moisture sensor;
   b) ignition, windshield wiper, and moisture sensor;
   c) ignition, light sensor and moisture sensor;
   d) ignition and moisture sensor.

6. The invention of claim 1, in which the relay switch is a solid state switch.

7. The invention of claim 1, in which the relay switch is a solid state switch and in which the control means is a triac metal oxide semiconductor (TMOS).

8. The invention of claim 1, in which the relay switch is a solid state switch and in which the control means is a gate turnoff switch (GTO).

9. The invention of claim 1, in which said logic circuitry comprises a plurality of first logic circuit means connected in parallel, said first logic circuit means producing a first signal output to said first relay circuit.

10. The invention of claim 9, in which a plurality of first signal outputs are operative in series to activate said first relay circuit.

11. The invention of claim 9, in which a plurality of first signal outputs are operative in parallel to activate said first relay circuit.

12. The invention of claim 5, and a second relay circuit, said second relay circuit being alternately connectable to said activating means for said relay switch, said power supply means connected to said second relay circuit, control means for said second relay circuit, said logic circuitry connecting the outputs of said ignition, windshield wiper and light sensor switches to the control means for said second relay circuit, said second relay circuit operating to turn the headlights off when any of the following are turned off:
 a) ignition;
 b) windshield wiper, light sensor and moisture sensor.

13. The invention of claim 12, in which a plurality of second signal outputs are operative in series to activate said second relay circuit.

14. An automatic system for controlling the turning on of vehicle windshield wipers when any of the following switch combinations are turned on:
 a) ignition, light sensor and moisture sensor;
 b) ignition and moisture sensor;
 and keeping them on as long as any of such switch combinations are on, comprising manual on-off switches for the ignition and condition responsive switches for the light sensor and moisture sensor, a multistage digital logic circuit having a first stage which comprises a plurality of gates coupled to the outputs of said switches, at least one additional stage of gates connected to the outputs of said first stage of gates, a first relay circuit, an electronic relay switch, said relay switch having means for connecting said windshield wipers to power supply means, said first relay circuit being alternately connectable to actuating means for said relay switch which governs the connection of said windshield wipers to said power supply means, said power supply means connected to said first relay circuit, and control means for said first relay circuit, said multistage digital logic circuit connecting the outputs of said ignition, light sensor and moisture sensor switches to the control means for said first relay circuit.

15. The invention of claim 14, and opto-isolator semiconductor means between the ignition, light sensor and moisture sensor switches and the relay circuit which isolates the input voltages from the outputs of the semiconductor means.

16. The invention of claim 14, in which time delay mean sis interposed between the ignition switches and the logic circuitry to protect the logic means from transient voltages and to maintain a high level of voltage for a limited time after the logic circuitry of the ignition switch is turned off.

17. The invention of claim 14, in which the relay switch is a solid state switch.

18. The invention of claim 14, in which the relay switch is a solid state switch and in which the control means is a triac metal oxide semiconductor (TMOS).

19. The invention of claim 14, in which the relay switch is a solid state switch and in which the control means is a gate turnoff switch (GTO).

20. The invention of claim 14, in which a plurality of first signal outputs are operative in series to activate said first relay circuit.

21. The invention of claim 14, in which a plurality of first signal outputs are operative in parallel to activate said first relay circuit.

22. The invention of claim 14, said vehicle having a manual windshield wiper switch, and a second relay circuit, said second relay circuit being alternately connectable to said activating means for said relay switch, said power supply means connected to said second relay circuit, control means for said second relay circuit, said logic circuitry having first means connecting the outputs of said ignition, windshield wiper, light sensor and moisture sensor switches to the control means for said second relay circuit, said logic circuitry having auxiliary means connecting the outputs of said ignition and said windshield wiper switch to said control means for said second relay circuit, said auxiliary means, bypassing said first connecting means to permit turning off of said windshield wipers by said windshield wiper switch.

23. An automatic system for controlling the turning on of vehicle headlights when any of the following switch combinations are turned on:
 a) ignition, windshield wiper, light sensor;
 b) ignition, and windshield wiper;
 c) ignition and light sensor;
 and keeping them on as long as any of such switch combinations are on, comprising manual on-off switches for the ignition and windshield wiper and a condition responsive switch for the light sensor, a multistage digital logic circuit having a first stage which comprises a plurality of gates coupled to the outputs of said switches, at least one additional stage of gates connected to the outputs of said first stage of gates, a first relay circuit, an electronic relay switch, said relay switch having means for connecting said headlights to power supply means, said first relay circuit being alternately connectable to actuating means for said relay switch which governs the connection of said headlights to said power supply means; said power supply means connected to said first relay circuit, and control means for said first relay circuit, said multistage digital logic circuit connecting the outputs of said ignition, windshield wiper and light sensor switches to the control means for said first relay circuit, said control means including pulse generator means.

24. The invention of claim 23, and opto-isolator semiconductor means between the ignition, windshield wiper and light sensor switches and the relay circuit which isolates the input voltages from the outputs of the semi-conductor means.

25. The invention of claim 23, in which time delay means is interposed between the ignition switch and the logic circuitry to protect the logic means from transient voltages and to maintain a high level of voltage for a limited time after the logic circuitry of the ignition switch is turned off.

26. The invention of claim 23, in which time delay means is interposed between the windshield wiper switch and the logic means so that the windshield wipers will appear to be continuously on during intermittent operation.

27. The invention of claim 23, and a moisture sensor switch, said system controlling the turning on of the vehicle headlights when any of the following additional switch combinations are turned on:
 a) ignition, windshield wiper, light sensor and moisture sensor;

b) ignition, windshield wiper, and moisture sensor;
c) ignition, light sensor and moisture sensor;
d) ignition and moisture sensor.

28. The invention of claim 23, in which the relay switch is a solid state switch.

29. The invention of claim 23, in which said logic circuitry comprises a plurality of first logic circuit means connected in parallel, said first logic circuit means producing a first signal output to said first relay circuit.

30. The invention of claim 19, in which a plurality of first signal outputs are operative in series to activate said first relay circuit.

31. The invention of claim 19, in which a plurality of first signal outputs are operative in parallel to activate said first relay circuit.

32. The invention of claim 22, and a second relay circuit, said second relay circuit being alternately connectable to said activating means for said relay switch, said power supply means connected to said second relay circuit, control means for said second relay circuit, said logic circuitry connecting the outputs of said ignition, windshield wiper and light sensor switches to the control means for said second relay circuit, said second relay circuit operating to turn the headlights off when any of the following are turned off:
a) ignition;
b) windshield wiper, light sensor and moisture sensor.

33. The invention of claim 32, in which said logic circuitry comprises a plurality of first and a plurality of second logic circuit means, each connected in parallel, said first logic circuit means producing a first signal output to said first relay circuit and said second logic circuit means producing a second signal output to said second relay circuit.

34. The invention of claim 32, in which a plurality of second signal outputs are operative in series to activate said second relay circuit.

35. An automatic system for controlling the turning on of vehicle headlights when any of the following switch combinations are turned on:
a) ignition, windshield wiper, light sensor;
b) ignition, and windshield wiper;
c) ignition and light sensor;
and keeping them on as long as any of such switch combinations are on, comprising manual on-off switches for the ignition and windshield wiper and a condition responsive switch for the light sensor, a multistage digital logic circuit having a first stage which comprises a plurality of gates coupled to the outputs of said switches, at least one additional stage of gates connected to the outputs of said first stage of gates, a first relay circuit, an electronic relay switch, said relay switch means having means for connecting said headlights to power supply means, said power supply means connected to said first relay circuit, and control means for said first relay circuit, said multistage digital logic circuit connecting the outputs of said ignition, windshield wiper and light sensor switches to the control means for said first relay circuit, in which the relay switch means is a solid state gate turnoff switch.

36. The inventions of claim 35, and opto-isolator semi-conductor means between the ignition, windshield wiper and light sensor switches and the relay circuit which isolates the input voltages from the outputs of the semi-conductor means.

37. The invention of claim 35, in which time delay means is interposed between the ignition switch and the logic circuitry to protect the logic means from transient voltages and to maintain a high level of voltage for a limited time after the logic circuitry of the ignition switch is turned off.

38. The invention of claim 35, in which time delay means is interposed between the windshield wiper switch and the logic means so that the windshield will appear to be continuously on during intermittent operation.

39. The invention of claim 35, and a moisture sensor switch, said system controlling the turning on of the vehicle headlights when any of the following additional switch combinations are turned on:
a) ignition, windshield wiper, light sensor and moisture sensor;
b) ignition, windshield wiper, and moisture sensor;
c) ignition, light sensor and moisture sensor;
d) ignition and moisture sensor.

40. The invention of claim 35, in which said logic circuitry comprises a plurality of first logic circuit means connected in parallel, said first logic circuit means producing a first signal output to said first relay circuit.

41. The invention of claim 40, in which a plurality of first signal outputs are operative in parallel to activate said first relay circuit.

42. The invention of claim 39, and a second relay circuit, said second relay circuit being alternately connectable to said activating means for said relay switch means, said power supply means connected to said second relay circuit, control means for said second relay circuit, said logic circuitry connecting the outputs of said ignition, windshield wiper and light sensor switches to the control means for said second relay circuit said second relay circuit operating to turn the headlights off when any of the following are turned off:
a) ignition;
b) windshield wiper, light sensor and moisture sensor.

43. The invention of claim 42, in which said logic circuitry comprises a plurality of first and a plurality of second logic circuit means, each connected in parallel, said first logic circuit means producing a first signal output to said first relay circuit and said second logic circuit means producing a second signal output to said second relay circuit.

44. The invention of claim 35, in which the relay switch means has means for connecting the parking lights to said power supply means.

45. The invention of claim 39, in which the relay switch means has means for connecting the parking lights to said power supply means.

46. The invention of claim 42, in which the relay switch means has means for connecting the parking lights to said power supply means, and in which said second relay circuit operates to turn off the parking lights when it operates to turn off the headlights.

47. The invention of claim 44, in which the relay switch means has a first section connecting the headlights and a second section connecting the parking lights to said power supply means.

48. The invention of claim 44, in which the relay switch means has a common means connecting the headlights and parking lights to said power supply means.

49. The invention of claim 45, in which the relay switch means has a first section connecting the headlights and a second section connecting the parking lights to said power supply means.

50. The invention of claim 45, in which the relay switch means has a common means connecting the headlights and parking lights to said power supply means.

51. The invention of claim 46, in which the relay switch means has a first section connecting the headlights and a second section connecting the parking lights to said power supply means.

52. The invention of claim 46, in which the relay switch means has a common means connecting the headlights and parking lights to said power supply means.

* * * * *